United States Patent
Gibbons et al.

(10) Patent No.: US 6,232,044 B1
(45) Date of Patent: May 15, 2001

(54) INFRARED CHOPPER USING BINARY DIFFRACTIVE OPTICS

(75) Inventors: Robert C. Gibbons, Richardson; Samuel R. McKenney, Dallas; S. Charles Baber, Richardson; Richard R. Chang, McKinney; Michael C. Bell, Garland, all of TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 08/159,879

(22) Filed: Nov. 30, 1993

(51) Int. Cl.$^7$ ............... B29D 11/00; G02B 5/02; G02B 26/04
(52) U.S. Cl. ............ 430/321; 430/320; 250/347; 359/210; 359/599; 359/569; 264/1.32
(58) Field of Search ................. 430/321, 323; 359/209, 210, 226, 355, 565, 569, 599; 250/331, 347; 264/1.1, 1.32, 1.34, 1.9

(56) References Cited

U.S. PATENT DOCUMENTS

| | | | |
|---|---|---|---|
| 4,153,654 | * | 5/1979 | Maffitt et al. ............... 264/1 |
| 4,427,265 | * | 1/1984 | Suzuki et al. ............... 359/599 |
| 4,567,123 | * | 1/1986 | Ohtaka et al. ............... 430/321 |
| 5,051,591 | * | 9/1991 | Trotta et al. ............... 250/351 |
| 5,320,787 | * | 6/1994 | Hayashi et al. ............... 264/1.3 |
| 5,330,880 | * | 7/1994 | Horigome et al. ............... 430/321 |
| 5,385,638 | * | 1/1995 | Isano et al. ............... 164/2 |

* cited by examiner

Primary Examiner—Martin Angebranndt
(74) Attorney, Agent, or Firm—Baker Botts L.L.P.

(57) ABSTRACT

A chopper and method of making same, the chopper being fabricated by initially generating a photomask in conjunction with software. The software provides the lens design to be finally stamped onto the chopper element. A silicon wafer is then etched by reactive ion etching using the photomask to provide the pattern and resulting in a silicon wafer master of the chopper pattern with regions in the shape of lenslets to be formed of desired dimension. The chopper pattern on the silicon wafer is then replicated with a hard material which can be easily stripped from the silicon wafer without damaging either the wafer or the hard material, preferably deposited nickel. The separated nickel replication is then used in conjunction with a heavy press to stamp out sheets of an infrared transmissive flexible film, preferably polyethylene, with the lens pattern in the replication The film with the lens pattern thereon is the chopper element.

The system is designed to operate in the 8 to 13.5 micron range. While the software is designed for an individual lens, each lens is preferably in the shape of a hexagon with a plurality of such hexagons positioned on the film in a predetermined pattern, preferably that of an involute or spiral. The chopper is designed for rotation about its central axis.

20 Claims, 2 Drawing Sheets

INFRARED CHOPPER USING BINARY DIFFRACTIVE OPTICS

BACKGROUND OF THE INVENTION

1. Field of the Invention

This invention relates to a chopper formed in a plastic sheet for use primarily in forward looking infrared (FLIR) systems and principally, but not limited to such systems, of the type utilizing uncooled ferroelectric infrared pyroelectric detectors.

2. Brief Description of the Prior Art

Forward looking infrared (FLIR) systems generally utilize a detector and a chopper system in conjunction with the detector for calibration of the detector. Such calibration is generally performed on-line and between detector scanning operations. Prior art infrared detectors have generally been of the cooled variety, operating at temperatures in the vicinity of liquid nitrogen, about 77° K More recently, FLIR systems have been developed which use uncooled detectors, such systems being preferred when sufficient sensitivity can be obtained therefrom. An uncooled detector system utilizing a ferroelectric detector is intrinsically a differencing detector whose signal is the difference between that of the viewed scene and that of a reference source. In order to minimize dynamic range problems in the detectors, it is desirable to match the reference flux as closely as possible to the average scene flux. This is typically accomplished with the chopper which alternately permits the detector to view the scene and then view a reference source representing the average scene flux.

For purposes of minimizing the scene flux/reference flux delta, some FLIR systems have used as a reference source an image of the system exit pupil or an approximation of the system exit pupil. The most simple technique to approximate the exit pupil is to defocus the optical system. In the present day systems, this is accomplished in one of two ways, these being either (1) with a thick flat plate which is cut out in appropriate areas to pass the scene radiation, whereby, in solid areas, an optical defocus occurs, resulting in a pupil approximation or (2) with a solid flat plate which is covered with small ground lenslets in a pattern matching the solid area of a scanner, these lenslets accomplishing the defocus.

A problem with prior art choppers of the second type described above has been cost. In order to provide a chopper of the above described second type having a plurality of lenslets, it has been necessary to grind the lenslets individually, generally in germanium, to provide a predetermined pattern. Such prior art choppers have also been fabricated using binary diffractive optic pattern generated photomasks in conjunction with a high precision laser writer followed by etching of the desired lens patterns into the germanium wafer. Such processes have been costly. It is therefore desired to provide choppers at greatly reduced cost, preferably at a small fraction of the present cost.

SUMMARY OF THE INVENTION

In accordance with the present invention, there is provided a chopper and a method of fabrication thereof which meets the above noted economic goals. The chopper is designed for rotation about its central axis.

Briefly, the chopper in accordance with the present invention is fabricated by initially generating a photomask. The photomask is generated in conjunction with software, the preferred software being set forth herein in the APPENDIX The software, which uses the language AutoLISP by AUTOCAD, consists of four macro routines which generate an exact scale graphical pattern of the lens array. Several lens design and chopper system variables are input and the software generates a two level data file of the graphical pattern.

Upon initiation of the first macro, the operator is queued for the design variable and then performs the calculations generating the spiral shaped boundary and fills the space within the boundary with an array of Fresnel phase plate lens structures. Several operator design inputs are required during the construction of the file. Once the first macro is loaded, all remaining macros self-load and pass calculated data to the next macro.

Each macro routine is summarized as follows:

SPIRAL.LSP generates the spiral shaped boundary which is sized to modulate the detector for a specific period of the detector sampling time. User inputs are several detector and chopper wheel assembly shape parameters. The spiral is generated using an Archimedes spiral math function.

BDO.LSP generates a single unit cell lens containing all of the lens structure. User inputs are the index of refraction of the substrate, lens diameter, spherical radius and design wavelength. The unit cell lens structure is generated using equations that model wavefront diffraction theory.

PGON.LSP takes the single circular lens and trims it to a hexagon shaped pattern for perfect nesting of the lenses without overlap or gaps. There are several operator steps to identify which segments of the lens to eliminate.

BDOMATRM.LSP generates a honeycomb array of hexagons and blocks the hexagon shaped unit cell into each hexagon of the array.

The software accordingly generates a mask having the lens design to be finally stamped onto the chopper element as explained herein below.

A silicon wafer is then etched by reactive ion etching, using the photomask to provide the pattern, resulting in a silicon wafer master of the chopper pattern with regions in the shape of lenslets to be formed of desired dimension. The chopper pattern on the silicon wafer is then replicated with a hard material which can be easily stripped from the silicon wafer without damaging either the wafer or the hard material, such material preferably being a thin layer of silver of about 500 Å over which is electro-plated the nickel to a depth of at least 0.10 inch. The nickel replication of the pattern on the silicon wafer is then separated from the silicon wafer by placing the silicon pattern with silver and nickel layers thereon in a bath which removes the silver selectively to the nickel, preferably photoresist, although gold film provides a superior mask at added expense, the separated replication then being used in conjunction with a heavy press as a stamp to stamp the lens pattern into individual sheets of an infrared transmissive material, preferably flexible film which is preferably polyethylene. The infrared transmissive material is preferably heated prior to stamping so that the pattern on the stamp is more easily impressed into the film. The film with the lens pattern thereon is the chopper element. Such chopper elements can be continually stamped out on individual sheets of the film in conjunction with the silicon wafer and the heavy press which drives the silicon wafer into the film, as above described, the silicon wafer operating as a mold or die. For polyethylene. film (index of refraction=1.52) and a wavelength of 10 $\mu$meters, the lens structure depth is approximately 9 $\mu$meters (0.00035 inch). Success has been achieved at 0.003 inch film thickness over the environmental temperature spectrum of the sensor without distortion of the small lens structure shapes.

The system is designed to operate in the 8 to 13.5 micron range and the APPENDIE is designed for operation in this range. Accordingly, the individual lenses are fabricated for operation in this range by the software. The software is designed for an individual lens, each lens having a perimeter preferably in the shape of a hexagon. A plurality of equally sized such hexagons are positioned on the film within an envelope in the shape of a spiral with the radius increasing proportional to the angle of rotation. An involute spiral and Archimedes spiral are the preferred envelope shapes. The hexagonal shape is preferred because hexagons can be fitted together such that they cover all of the area within the involute or spiral with no spaces between lenses.

The software generates two file layers. The first file layer is the spiral shaped pattern and the second layer is the array of hexagons. The hexagon file layer contains a hidden layer which compresses the file to a manageable size. These two files are downloaded to a database pattern compiler which translates the data into a format that is readable by the laser patterning system which then fabricates the photomask by writing the pattern onto the surface of an emulsion covered glass slide, the emulsion being, for example, AGFA photomask plates, Part No. PF-HD. There are many different types of emulsions that can be used and these would be apparent to one skilled in the art.

The hexagon array file layer is generated by the software in a rectangular window shaped pattern which overlies the spiral file layer. The hexagons that are completely exterior to the boundary of the spiral are eliminated from the file by the operator to reduce the file size. Those lens cell structures that stagger the spiral boundary and all those within the boundary are printed by the photomask writing equipment. The portion of the lens structure that falls external to the spiral is hidden by the boundary of the spiral file when the photomask is fabricated and thus it is not necessary to trim this lens structure away.

Each individual lens is a diffractive structure designed to defocus incident energy by a predetermined amount. The purpose is to achieve a defocused image of the exterior scene for use as a reference source for image differencing.

The exact shape of each lens is determined by the modulo $\pi$ behavior of the desired wavefront deformation. FIG. 3 shows this modulo $\pi$ behavior wherein the resultant shape for the individual lens is a concentric grating with grating depth determined from $$T(r) = T_{opt} \cdot \left[ \frac{\Psi_F(r)}{2\pi} + 1 \right]$$

where $T_{opt}$ is the optimum thickness for a $2\pi$ phase shift, and is given by $T_{opt} = \lambda/\Delta n$, and $\Psi_F(r)$ is the desired radial phase shift function. Normally, $\Delta n$ is the deviation of the refractive index of the zone material from that of the surrounding medium (air) and $\lambda$ is the design wavelength.

DESCRIPTION OF THE PREFERRED EMBODIMENT

The present invention is similar to the second technique discussed above, however the ground lenslets on germanium in the shape of an involute are replaced with an array of lenslets formed from binary diffractive elements on a film. This array performs the same function as the ground lenslets, but is much easier and more economic to fabricate. The chopper uses a lenslet array composed of binary diffractive elements to perform the uniform defocusing required for calibration. The purpose of the lenslets is to defocus the radiation falling on the detector during the scan dead period of the imaging system. This defocused radiation is an approximation of the pupil irradiance and is used for differencing.

The chopper is fabricated by generating a photomask. The photomask is generated in conjunction with the software set forth herein as APPENDIX The software controls a laser which etches out the programmed pattern on a standard mask material, preferably AGFA Photomask Plates Part No. PF-HD. The mask now contains the mask pattern and, accordingly, the lens design to be ultimately stamped onto the chopper element. A silicon wafer is then etched through the mask by reactive ion etching in standard manner to provide a master of the chopper lens pattern on the silicon wafer. The chopper pattern on the silicon wafer is then replicated with a hard material which can be easily stripped from the silicon wafer without damaging either the wafer of the hard material, preferably a thin layer of silver of about 500 Å over which is electroplated the nickel to a depth of at least 0.10 inch. The nickel replication of the pattern on the silicon wafer is then separated from the silicon wafer by placing the silicon pattern with silver and nickel layers thereon in a bath which removes the silver selectively to the nickel, preferably photoresist, although gold film provides a superior mask at added expense, the separated replication then being used in conjunction with a heavy press as a stamp to stamp the lens pattern into individual sheets of an infrared transmissive material, flexible film which is preferably polyethylene. The infrared transmissive material is preferably heated prior to stamping so that the pattern on the stamp is more easily impressed into the film. The film with the lens pattern thereon is the chopper element. Such chopper elements can be continually stamped out on individual sheets of the film in conjunction with the silicon wafer and the heavy press which drives the silicon wafer into the film, as above described, the silicon wafer operating as a mold or die.

The system is designed to operate in the 8 to 13.5 micron range and the APPENDIX is designed for operation in this range. Accordingly, the individual lenses are fabricated for operation in this range by the software. While the software is designed for an individual lens, a plurality of such lenses are positioned on the film in a predetermined pattern, preferably within an involute or spiral.

Figure 1:
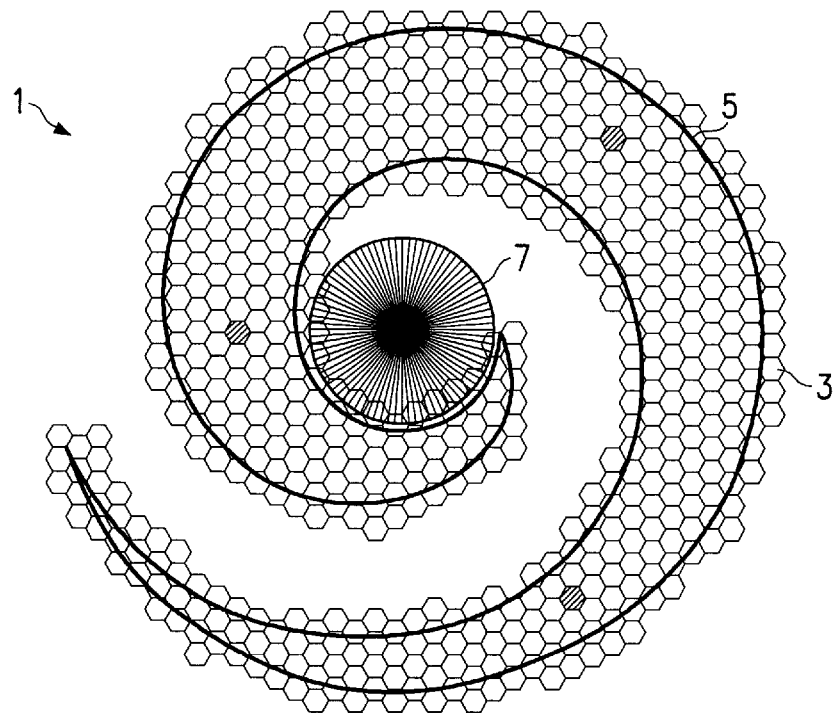
FIG. 1 shows a chopper in accordance with the present invention.

FIG. 1 shows a chopper in accordance with the present invention which has been fabricated in accordance with the present invention. There is shown a chopper 1 having a plurality of lenslets 3, each lenslet being in the shape of a hexagon an being about 0.2 inches across opposing sides. The lenslets 3 are of the same dimensions and are positioned to be interfitting with no spaces therebetween. The lenslets 3 are disposed within an involute 5. The lenslets 3 are impressed into a polyethylene film (not numbered) having a thickness of at least 0.10 inch which surrounds the involute 5. An aperture 7 is disposed at the center of the chopper 1 for securing the chopper to a device which will rotate the chopper in standard manner.

Figure 2:
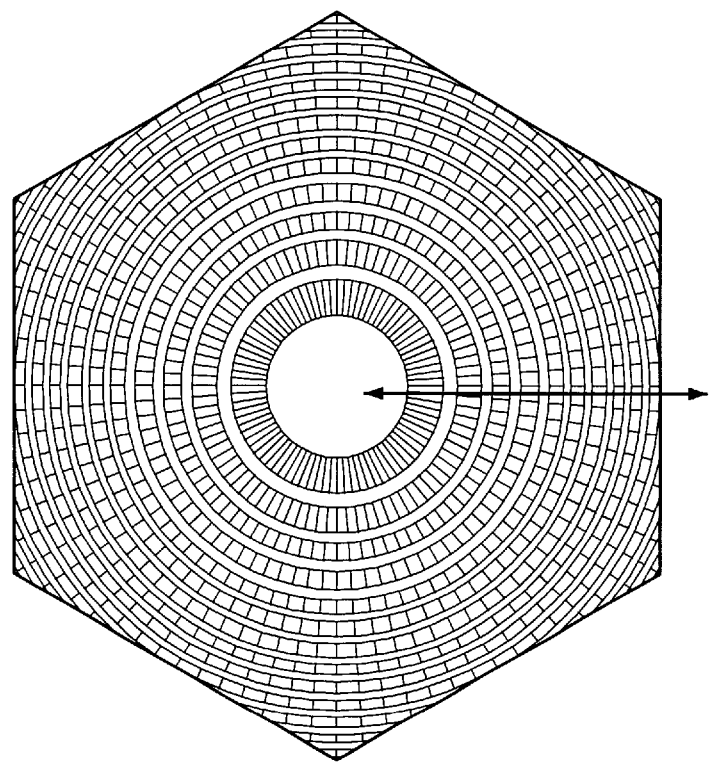
FIG. 2 is an enlarged view of one of the hexagonally shaped lenslets of FIG. 1.
Figure 3:
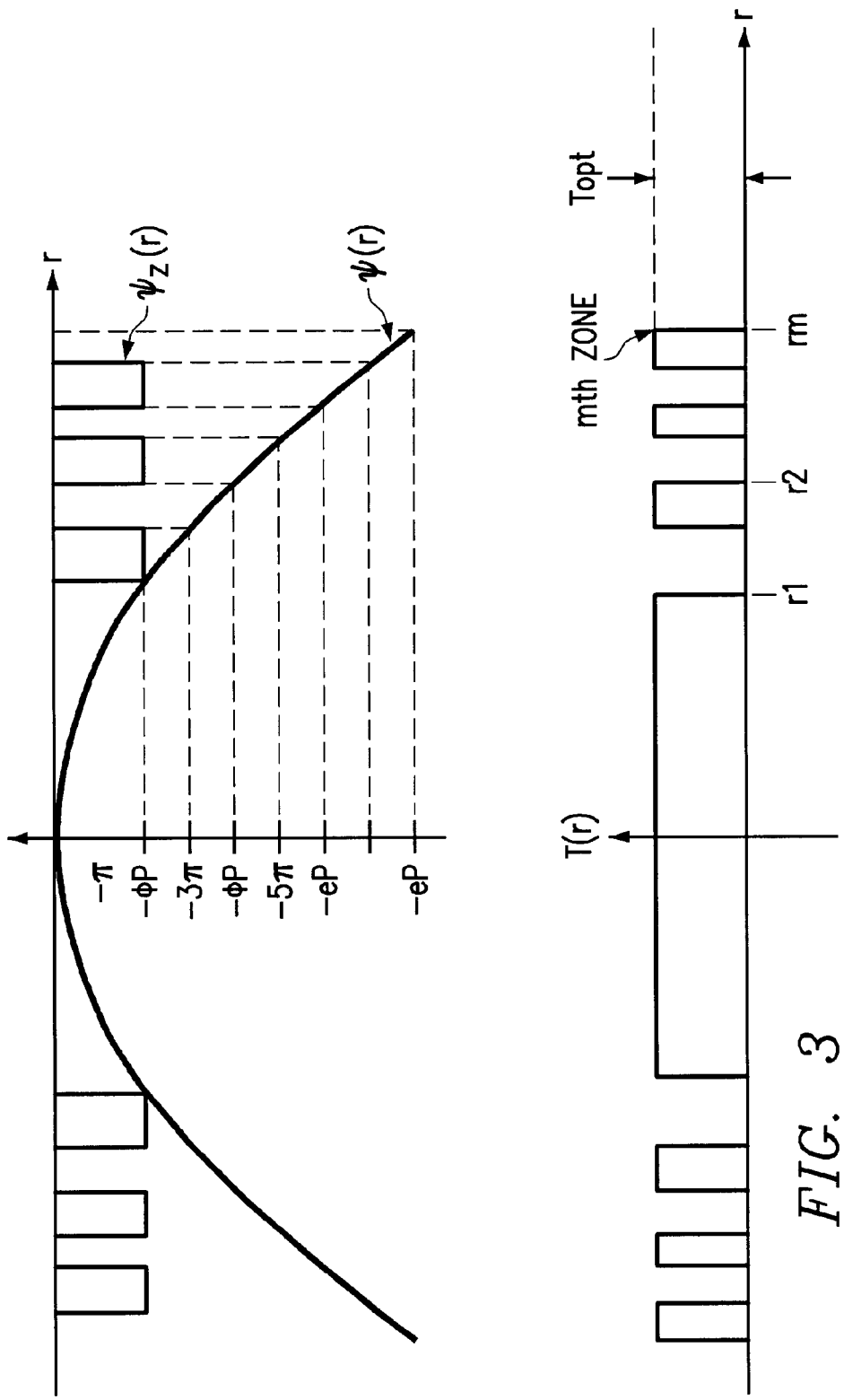
FIG. 3 is a graph of the phase shift function for a Fresnel phase plate.

Referring now to FIG. 2, there is shown an enlarged view on one of the lenslets 3 of FIG. 1. FIG. 3 shows how a cross section through the lenslet would appear. The lenslet is essentially a binary Fresnel zone plate encoding phase information required for focusing (or defocusing, in this case) the scene flux.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modification.

What is claimed is:

1. A method of making a chopper comprising the steps of:
   (a) providing an etchable base member;
   (b) forming a mask on said base member for providing a predetermined diffractive lens pattern on said base member;
   (c) etching said base member through said mask to form said diffractive lens pattern on said base member;
   (d) replicating said diffractive lens pattern onto a rigid material depositable on said base member and removable from said base member with substantially no damage to said diffractive lens pattern replicated on said rigid material or to said base member; and
   (e) stamping the diffractive lens pattern replicated on said rigid material onto an infrared transmissive deformable sheet capable of retaining the diffractive lens pattern pressed thereinto to provide said chopper.

2. The method of claim 1 wherein said infrared transmissive sheet is polyethylene.

3. The method of claim 2 wherein said base member is silicon.

4. The method of claim 3 wherein said rigid material is nickel.

5. The method of claim 2 wherein said rigid material is nickel.

6. The method of claim 1 wherein said base member is silicon.

7. The method of claim 6 wherein said rigid material is nickel.

8. The method of claim 1 wherein said rigid material is nickel.

9. A chopper which comprises:
   (a) an infrared transmissive deformable film capable of containing a plurality of diffractive lens patterns pressed thereinto; and
   (b) a plurality of diffractive lenses disposed in said film in a predetermined pattern, all of said diffractive lenses disposed at least in part within a predetermined geometrical shape to provide said chopper.

10. The chopper of claim 9 wherein said film is a polymeric material.

11. The chopper of claim 10 wherein said lenses are hexagonal.

12. The chopper of claim 11 wherein said geometrical shape is an involute.

13. The chopper of claim 10 wherein said geometrical shape is an involute.

14. The chopper of claim 9 wherein said film is polyethylene.

15. The chopper of claim 14 wherein said lenses are hexagonal.

16. The chopper of claim 15 wherein said geometrical shape is an involute.

17. The chopper of claim 14 wherein said geometrical shape is an involute.

18. The chopper of claim 9 wherein said lenses are hexagonal.

19. The chopper of claim 18 wherein said geometrical shape is an involute.

20. The chopper of claim 9 wherein said geometrical shape is an involute.

* * * * *